United States Patent [19]

McCullough

[11] Patent Number: 5,035,055
[45] Date of Patent: Jul. 30, 1991

[54] FLEXIBLE DRIVE SHAFT CASING

[76] Inventor: Timothy J. McCullough, 833 Aurora Rd., Vermilion, Ohio 44089

[21] Appl. No.: 47,769

[22] Filed: May 8, 1987

[51] Int. Cl.$^5$ .......................... A22C 17/00; F16C 1/02
[52] U.S. Cl. ........................................ 30/276; 30/347
[58] Field of Search ..................... 464/52, 173; 30/276, 30/346, 389, 347; 17/1 G

[56] References Cited

U.S. PATENT DOCUMENTS

| | | | |
|---|---|---|---|
| 2,827,657 | 4/1954 | Bettcher | 17/1 |
| 3,024,532 | 3/1962 | Bettcher | 30/276 |
| 3,192,795 | 7/1965 | Pierce | 464/52 X |
| 3,238,808 | 3/1966 | Barnard | 464/52 X |
| 3,269,010 | 4/1964 | Bettcher | 30/276 |
| 3,481,156 | 12/1969 | De Csipkes | 464/52 |
| 3,581,523 | 6/1971 | Bartholomew | 464/52 |
| 4,324,043 | 4/1982 | McCullough | 30/276 |
| 4,494,311 | 6/1985 | McCullough | 30/276 |
| 4,575,938 | 3/1986 | McCullough | 30/276 |

Primary Examiner—Douglas D. Watts
Attorney, Agent, or Firm—Michael Sand Co.

[57] ABSTRACT

An improved casing for a flexible metal drive shaft or cable of the type used for transmitting power from an electric drive motor to the handpiece of a meat trimming knife. The drive shaft is rotatably mounted within the bore of a cylindrical sleeve formed of a dielectric plastic providing a low friction surface for the inner rotating metal shaft. A metal wire braid is formed about the outer surface of the plastic sleeve to increase the longitudinal stability of the casing. An outer covering of a plastic material, preferably a food grade PVC, covers the wire braid.

16 Claims, 1 Drawing Sheet

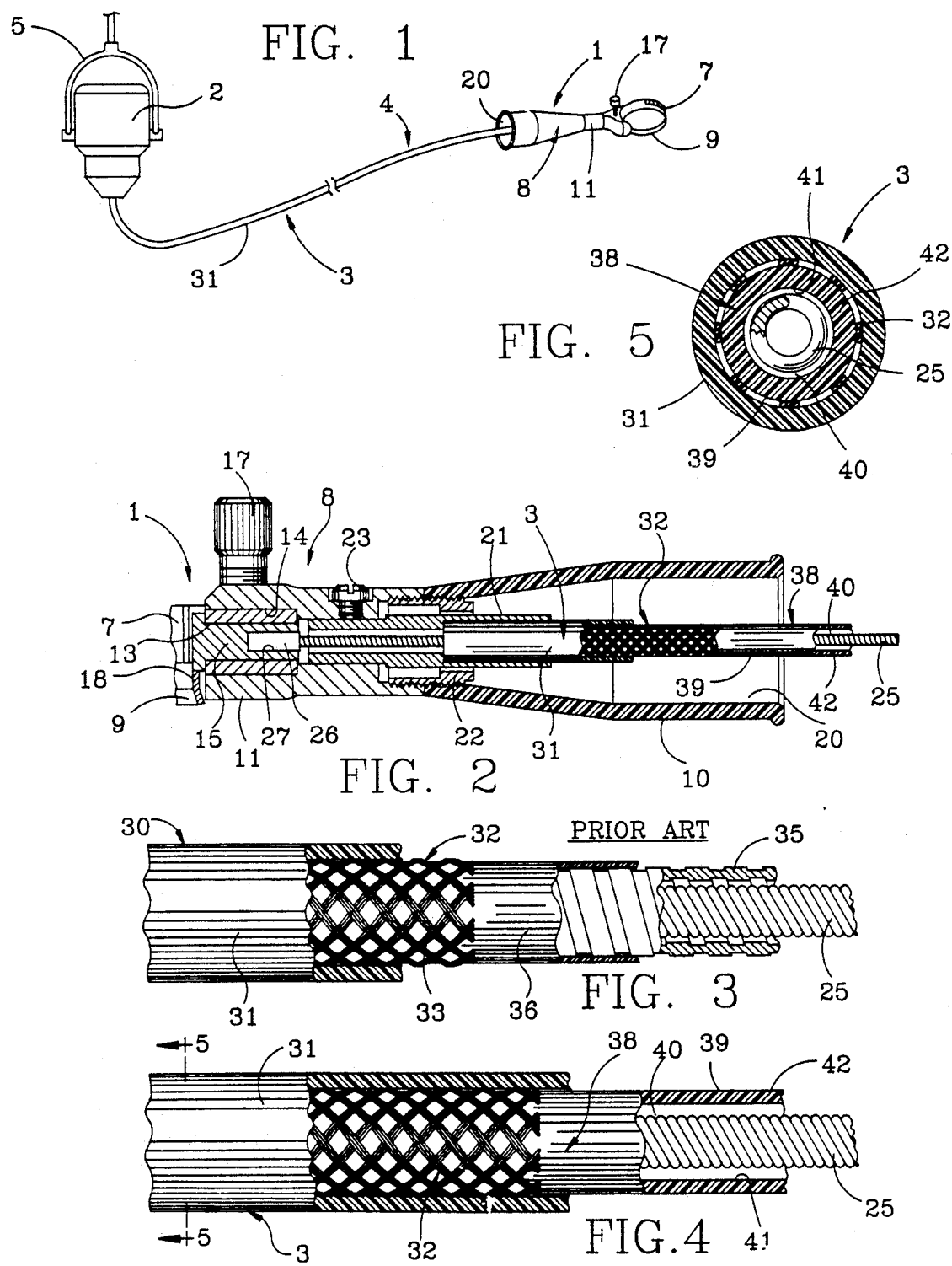

FLEXIBLE DRIVE SHAFT CASING

TECHNICAL FIELD

The invention relates to flexible drive shafts for mechanically transmitting power and in particular to the casing for covering the drive shaft. More particularly, the invention relates to an improved casing which contains the flexible drive shaft of a meat trimming knife.

BACKGROUND ART

Various types of power driven meat cutting tools have been devised wherein a ring blade is rotatably mounted on a blade holder which in turn is mounted on a manually manipulated power driven handle or handpiece. These tools have been used for some time to facilitate the removal of meat from a carcass primarily in a trimming operation, or for removing the meat remains from the bones. These meat cutting tools are either electrically or pneumatically driven. Some examples of the electrically driven prior art meat cutting tools are shown in U.S. Pat. Nos. 2,827,657; 3,024,532; 3,269,010; 4,324,043; 4,494,311 and 4,575,938.

These electrically driven meat trimming tools generally consist of a tubular handpiece formed of metal or plastic and having a hollow bore. An annular blade holder is attached to the front portion of the handpiece with a ring blade being removably mounted thereon by various mounting arrangements. The blade is formed with gear teeth extending about the top thereof, which teeth are in driving engagement with a pinion gear mounted within the end of the handpiece. The flexible metal drive shaft, one end of which is connected to an electric motor located adjacent to the work area, enters the rear of the handle and extends therethrough and terminates in a squared end. The squared end is engaged in a complementary-shaped opening in the rear of the pinion gear for rotatably driving the gear. Heretofore the flexible metal drive cable is surrounded by a flexible casing which terminates within an end of a hollow tubular shaped ferrule which is located within the handpiece, with the cable continuing through the ferrule into the pinion gear.

The usual operating speed of the electric drive motor and correspondingly of the drive shaft and rotatably mounted blade is approximately 3,450 rpm. The drive shaft is formed of one or more spiraled wires and is rotatably mounted with a drive shaft casing. The casing is formed of wrapped or wound wires of various cross sectional configurations which form a flexible yet strong casing or tubular housing for containing the rotating metal drive shaft. This metal casing then is covered with a thin film of plastic, preferably a reinforced polyethelene film having a thickness of approximately 4 mils, which subsequently is covered with an open mesh stainless steel wire braid. The braid then is covered by a coating of plastic preferably a food grade PVC material. The film prevents the penetration of the PVC through the braid and into the inner metal casing.

Although these prior art flexible drive shaft casings have performed satisfactorily, they possess certain inherent disadvantages and problems. The most serious problem is that the flexible drive shaft which is formed of metal, rotates at an extremely high rate of speed within the metal inner casing, and results in a metal-to-metal contact producing friction and heat. This metal-to-metal contact becomes especially critical when a high resistance force is applied to the rotating blade. For example when the operator digs the blade deep into the meat this places a large torque on the blade and correspondingly on the drive shaft. This torque causes the drive shaft to spiral or form a sine wave configuration within its metal casing causing contact areas with the casing resulting in "hot spots" developing between the casing and shaft. These contact areas shorten the life of both the shaft and casing requiring periodic replacement of one or both of the components. This excessive rubbing or contact between the shaft and casing quickly wears away the galvanizing coating which is formed on the inside surface of the metal casing. The metal casing must be galvanized since it is subjected to continuous wet and damp conditions in a meat trimming plant and must be continually washed and cleaned since the equipment is in contact with the meat. These worn areas then become subject to rapid rusting which provides a further abrasive action against the rotating cable accelerating the destruction of the cable and casing. Also upon the torque becoming too great, the drive shaft will "lock up" within the protective metal casing due to the spiraling effect of the shaft. The inner metal casing also increases the weight of the casing assembly and is relatively stiff requiring greater effort on the part of the operator when moving the knife across the carcass increasing operator fatigue after extended periods of use during a usual work shift.

Therefore, the need has existed for an improved flexible drive shaft casing of the type intended primarily for use with the flexible drive shaft of a meat trimming knife which eliminates the above described problems.

DISCLOSURE OF THE INVENTION

Objectives of the invention include providing an improved casing for a flexible metal drive shaft primarily for transmitting power to the handpiece of a meat trimming knife from an electric motor for rotating a pinion gear within the handpiece to rotatably drive a ring knife blade mounted on the front end of the handpiece. A further objective is to provide such an improved casing in which the inner sleeve of the casing is formed of a low friction plastic material such as nylon 66, which provides a low friction sliding engagement with the internal rotating metal drive shaft, thereby reducing heat generation within the casing upon contact of the drive shaft with the casing.

A still further objective is to provide such an improved drive shaft casing in which the inner sleeve is formed of a plastic material thereby eliminating any rusting or deterioration, in which the inner sleeve is covered by a usual stainless steel open mesh braid to provide longitudinal stability for the casing, and in which the formation of the inner casing of plastic eliminates the need for the polyethelene film to prevent migration of the outer PVC covering through the braid and into the heretofore inner metal casing. Another objective is to provide such an improved casing which is easier to manufacture since the inner plastic sleeve can be injection molded or extruded of a lighter weight, less expensive plastic material than the heretofore spiral formed metal casing, which provides a more flexible casing thereby reducing fatigue on the hand of the operator during a work shift period, and in which the reduction of the friction and generated heat in the drive shaft and inner casing increases considerably the life of the casing and drive shaft.

A further objective is to provide such an improved casing which enables a higher rotational speed to be obtained on the drive shaft thereby providing greater rotational speed for the cutting blade of the handpiece which increases cutting efficiency, which produces less heat and wear between the casing and drive shaft thereby reducing the down time of the knife for blade sharpening and replacement, which reduces drag on the electric drive motor, and which does not affect the size of the casing and its manner of attachment to the handpiece and drive motor enabling it to be interchangable with existing handpieces and equipment using existing prior art drive shaft casings having the inner metal sleeve.

Still another objective of the invention is to provide such an improved drive shaft casing which enables the flexible metal drive shaft and stainless steel braid to be electrically insulated from each other by the inner plastic sleeve thereby enabling the shaft and braid to be used as conductors for performing certain switching and control operations if desired, between the handpiece and electric drive motor; in which the improved casing meets health and food standards required of equipment used in meat processing plants; and in which the drive shaft assembly can be maintained in a clean and sanitary condition without rusting or accumulating harmful bacteria.

These objectives and advantages are obtained by the improved casing for a flexible drive shaft, the general nature of which may be stated as including a fixed inner sleeve formed with an outer surface and an internal bore having a diameter larger than the diameter of the drive cable, said inner sleeve being formed of a thermoplastic material; a metal wire braid formed of a plurality of crossing strands extending about the outer surface of the inner thermoplastic sleeve providing longitudinal stability thereto; and a fixed outer protective covering of a thermoplastic material extending over the wire braid.

BRIEF DESCRIPTION OF THE DRAWINGS

A preferred embodiment of the invention, illustrative of the best mode in which applicant contemplates applying the principles is set forth in the following description and is shown in the drawings, and is particularly and distinctly pointed out and set forth in the appended claims.

FIG. 1 is a diagramatic perspective view showing a usual electrically driven meat cutting assembly having a handpiece driven by an electric motor through a drive shaft contained within the improved drive shaft casing of the invention;

FIG. 2 is an enlarged sectional view of the handpiece of the meat cutting knife with a portion of the drive cable and shaft extending out of the rear of the handpiece;

FIG. 3 is an enlarged fragmentary view with portions broken away and in section, showing the prior art flexible drive shaft casing of which the present invention is an improvement thereon;

FIG. 4 is an enlarged view with portions broken away and in section, similar to FIG. 3, showing the improved flexible drive shaft casing of the invention; and FIG. 5 is an enlarged fragmentary sectional view taken on line 5—5, FIG. 4.

Similar numerals refer to similar parts throughout the drawings.

BEST MODE FOR CARRYING OUT THE INVENTION

A usual meat trimming unit is shown in FIG. 1. The unit includes a usual trimming knife indicated generally at 1, which is connected to an electric motor 2 by a drive shaft assembly indicated generally at 3. The improved drive shaft casing of the invention is indicated generally at 4 and is part of assembly 3. The electric motor is usually supported by a hanger 5, closely adjacent to a work table on which the meat trimming operation is being performed.

A usual annular blade holder 7 is mounted on the front end of a handpiece 8 for rotatably supporting a ring like cutting blade 9. Handpiece 8 is shown particularly in FIG. 2 and includes a handle 10, which may be formed of plastic, metal or other material. Handpiece 8 terminates in a front tubular body portion 11 on which blade holder 7 is mounted. A cylindrical sleeve bearing 13 is mounted within an enlarged front bore 14 of tubular body 11 and telescopically receives and rotatably mounts a pinion gear 15 therein. A grease reservoir 17 is mounted on tubular body 11 and communicates with bore 14 and contains a supply of edible grease, which is discharged onto bearing sleeve 13 in a usual manner well known in the art. This grease also provides lubrication for the meshing engagement between the teeth of pinion gear 15 and blade gear teeth 18. Handpiece 8 forms no particular part of the invention and may be of the type shown in U.S. Pat. No. 4,324,043.

Drive shaft assembly 3 enters an open end 20 of handpiece 8 and terminates in a cable casing ferrule 21 which extends through a treaded coupler 22. Ferrule 21 is secured within tubular body 11 by a set screw 23.

The flexible cable drive shaft 25 extends through ferrule 21 and terminates in a squared end 26 which extends into a complementary-shaped squared opening 27 formed in the rear of pinion gear 15 and provides the driving connection between cable 25 and gear 15 in a conventional manner.

The particular construction of handpiece 8 shown in FIG. 2 and described above and the means of terminating drive cable 25 therein, may be varied without affecting the concept of the invention and is illustrative as one type of handpiece for which the improved flexible drive shaft casing and associated drive shaft will be used.

A prior art drive shaft assembly is indicated generally at 30, and is shown in FIG. 3. Assembly 30 includes an outer covering 31 preferably formed of a food grade PVC material, of the type identified as type 2222-N78D Gray sold and distributed by Alpha Plastics of Newark, N.J. Covering 31 covers an open mesh wire braid covering indicated generally at 32, which is formed of a plurality of individual stainless steel wire strands. Preferably braid 32 consists of seventy-two individual strands preferably being a type 304 stainless steel having a diameter of approximately 0.009 inches, with braid 32 each strand being separated into a set of three strands shown at 33, with twelve of said sets being wound in one direction and another twelve sets being wound in the opposite direction to form an open mesh-like configuration as shown in FIG. 3.

Flexible drive shaft 25 is of a usual construction formed by a plurality of spiral wire strands and is rotatably mounted within an inner casing 35. Casing 35 is formed of one or more spiraled wire strands and is covered by a thin film 36 of plastic material, such as a reinforced polyethelene film, generally having the thickness of four mils. Film 36 prevents migration of the PVC material of outer covering 31 from being conveyed through braid 32 and into inner wire casing 35 during the formation of drive shaft assembly 30.

Improved drive shaft assembly 3, is shown particularly in FIGS. 4 and 5 and includes outer covering 31, wire braid 32 and flexible drive shaft 25 as in prior art drive shaft assembly 30 discussed above and shown in FIG. 3. In accordance with the main feature of the invention an inner sleeve indicated generally at 38, replaces wire casing 35 and plastic film 36. Sleeve 38 is formed of a low friction thermoplastic material the preferred material being nylon 66, although other thermoplastics may be used without affecting the concept of the invention. Wire braid 32 is formed on and lays along the outer cylindrical surface 39 of sleeve 38 without requiring any intervening barrier film similar to film 36. Sleeve 38 is formed with a hollow interior 40 having a diameter slightly larger than the diameter of drive shaft 25 to permit drive shaft 25 to rotate freely therein without continuous contact with inner cylindrical surface 41 which forms bore 40. In the preferred embodiment cylindrical wall 42 which forms inner sleeve 38, has a thickness of approximately 0.05 inches and an outer diameter of approximately 0.375 inches.

In accordance with another of the main features achieved by improved drive shaft assembly 3, drive shaft 25 and wire braid 32 are electrically insulated by the dielectric material of sleeve 38. This enables cable 25 and braid 32 to be used as electrical conductors for actuating various controls and safety equipment, if desired, for certain meat trimming and other control operations. The use of plastic inner sleeve 38 reduces both the material cost and weight of prior casing assembly 30. Cost is reduced by eliminating the prior art wire casing 35 and plastic film 36. Also plastic sleeve 38 can be easily extruded or injection molded at a lower cost than the formation of wire casing 35. Furthermore, nylon sleeve 38 is approximately ten percent the weight of steel casing 35 and is approximately twenty-five percent of the cost of the steel casing. Furthermore, plastic sleeve 38 is rust and corrosive resistant and most importantly provides a low friction sliding surface when engaged by flexible drive shaft 25. This lower friction characteristic enables a higher rotational speed to be imparted on drive shaft 25 without increasing the amount of heat generated within sleeve 38 as would occur in prior art shaft assembly 30. It is anticipated that improved shaft assembly 3 will permit a rotational speed of 5,000 RPM to be achieved on cable 25 without affecting the operating characteristics thereof. This provides a more efficient meat trimming knife than if operating at the heretofore reduced speed of 3,450 RPM.

Thus the improved flexible shaft casing enables the longitudinal stability to be maintained by the use of wire braid 32 and provides a drive shaft assembly which is more flexible thereby reducing the fatigue on the hand and arm of an operator. This increases meat production and increases both the wear life of the drive shaft and casing assembly and operating efficiency thereof than heretofore possible with the use of metal inner sleeve 35 as shown in FIG. 3.

Accordingly, the improved flexible shaft casing is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved flexible shaft casing is constructed and used, the characteristics of the construction, and the advantageous, new and useful results obtained; the new and useful structures, devices, elements, arrangements, parts, and combinations, are set forth in the appended claims.

I claim:

1. An improved casing for a generally cylindrical flexible drive cable of a meat trimming knife of the type having an annular blade holder mounted on a front end of a handpiece with an annular cutting blade rotably mounted on said holder, in which gear means is mounted in the handpiece and drivingly engages the cutting blade, and in which the drive cable extends into the handpiece and is operatively engaged with the gear means to drive said gear means and cutting blade; wherein the improvement includes a fixed inner sleeve formed with an outer surface and an internal bore having a diameter larger than the diameter of the drive cable and defined by a continuously smooth cylindrical surface, said inner sleeve being formed of a thermoplastic material; a metal wire braid formed of a plurality of crossing strands extending about the outer surface of the inner thermoplastic sleeve providing longitudinal stability thereto; and an outer protective covering of a thermoplastic material extending over the wire braid.

2. The improved casing defined in claim 1 in which the inner sleeve is formed of nylon 66.

3. The improved casing defined in claim 1 in which the wire braid is formed of stainless steel.

4. The improved casing defined in claim 3 in which the braid is formed of seventy-two strands of wire comprising twenty-four sets of three strands per set; and in which twelve sets are wrapped in one direction about the inner sleeve and the other twelve sets are wrapped in an opposite direction about said sleeve.

5. The improved casing defined in claim 1 in which the outer covering is formed of PVC.

6. The improved casing defined in claim 1 in which the flexible drive cable is electrically insulated from the metal wire braid by the inner sleeve.

7. The improved casing defined in claim 1 in which the inner sleeve is formed by a cylindrical wall having a thickness of approximately 0.050 inches and an outer diameter of approximately 0.375 inches.

8. The improved casing defined in claim 1 in which the strands of the wire braid is type 304 stainless steel having a diameter of approximately 0.009 inches.

9. An improved casing for a flexible drive cable including a fixed inner sleeve formed with an outer surface and an internal bore defined by a continuously smooth cylindrical surface having a diameter larger than the diameter of the drive cable, said inner sleeve being formed of a thermoplastic material; a metal wire braid formed of a plurality of crossing strands extending about the outer surface of the inner thermoplastic sleeve providing longitudinal stability thereto; and a fixed outer protective covering of a thermoplastic material extending over the wire braid.

10. The improved casing defined in claim 9 in which the inner sleeve is formed of nylon 66.

11. The improved casing defined in claim 9 in which the wire braid is formed of stainless steel.

12. The improved casing defined in claim 11 in which the braid is formed of seventy-two strands of wire comprising twenty-four sets of three strands per set; and in which twelve sets are wrapped in one direction about the inner sleeve and the other twelve sets are wrapped in an opposite direction about said sleeve.

13. The improved casing defined in claim 9 in which the outer covering is formed of PVC.

14. The improved casing defined in claim 9 in which the flexible drive cable is electrically insulated from the metal wire braid by the inner sleeve.

15. The improved casing defined in claim 9 in which the inner sleeve is formed by a cylindrical wall having a thickness of approximately 0.050 inches and an outer diameter of approximately 0.375 inches.

16. The improved casing defined in claim 9 in which the inner sleeve is an injection molded plastic.

* * * * *